United States Patent [19]

Souloumiac

[11] Patent Number: 5,283,850

[45] Date of Patent: Feb. 1, 1994

[54] OPTICAL FIBER CONNECTOR WITH DEFORMABLE NON-METALLIC SLEEVE

[76] Inventor: Alain Souloumiac, 71, rue Bichat, FR-75010 Paris, France

[21] Appl. No.: 852,175

[22] PCT Filed: Aug. 7, 1991

[86] PCT No.: PCT/FR91/00653

§ 371 Date: Apr. 3, 1992

§ 102(e) Date: Apr. 3, 1992

[87] PCT Pub. No.: WO92/02836

PCT Pub. Date: Feb. 20, 1992

[30] Foreign Application Priority Data

Aug. 7, 1990 [FR] France .................... 90 10068

[51] Int. Cl.$^5$ ................................ G02B 6/38
[52] U.S. Cl. ........................ 385/84; 385/66; 385/78
[58] Field of Search ............ 385/84, 66, 43, 93, 385/78, 33

[56] References Cited

U.S. PATENT DOCUMENTS

| 4,186,999 | 2/1980 | Harwood et al. | 385/66 |
| 4,236,787 | 12/1980 | Iacono et al. | 385/66 |
| 4,614,402 | 9/1986 | Caron et al. | 385/66 |
| 4,828,353 | 5/1989 | Yamaguchi et al. | 385/66 |
| 5,095,517 | 3/1992 | Monguzzi et al. | 385/93 |

FOREIGN PATENT DOCUMENTS

| 0156361 | 10/1985 | European Pat. Off. . |
| 60-42719 | 3/1985 | Japan . |
| WO8601610 | 3/1986 | PCT Int'l Appl. . |
| 2022284 | 12/1979 | United Kingdom . |

Primary Examiner—John D. Lee
Assistant Examiner—Phan T. Heartney
Attorney, Agent, or Firm—Eckert Seamans Cherin & Mellott

[57] ABSTRACT

An optical fiber connector comprises a deformable sleeve (5) for receiving the fiber(s) in a rigid connector body (13) to hold the fibers (20) in position relative to the body. After compression, the front end of the sleeve remains set back inside the body.

9 Claims, 3 Drawing Sheets

OPTICAL FIBER CONNECTOR WITH DEFORMABLE NON-METALLIC SLEEVE

The present invention relates to a connector for at least one optical fiber end, for the purpose of connecting one or more fibers to an electronic component, or of connecting two or more fibers in alignment with each other.

There is a need to provide connectors for connecting fibers together or for connecting one or more optical fibers to an electronic component. Proper positioning of the fibers governs the quality of light transmission.

The various connection devices that have already been proposed mostly require the fiber(s) to be glued or crimped inside a connector part. However, such devices prevent any disassembly and thus any repair.

That is why other devices make use of the principle of radial compression to bring and hold a fiber in a rigid guide piece that ensures it is properly positioned. This applies to JP-A-60042719 and to WO/01610 which define such a connector. However there are two drawbacks in using a rigid guide piece. The first is to require machining tolerances concerning the entire piece which are very difficult to satisfy. The second is to require a special connector for each diameter of fiber.

EP-A-0 156 361 describes a device for fixing the end of an optical fiber, that device comprising a cylindrical sleeve pierced by an axial opening for passing the fiber and suitable for insertion in an adaptor. The sleeve is made of stainless steel, for example, and it has at least one radial slot imparting a degree of resilience thereto. The sleeve includes a tapering front guide portion which is compressed by the adaptor. However, the connector in that document suffers from a certain number of defects relating to the presence of a sleeve that projects beyond the connector and to the rigidity of the sleeve.

An object of the present invention is to obtain an improvement in the optical qualities of a connector, and in its general versatility, and also to obtain certain simplifications.

The present invention provides an optical fiber connector for receiving at least one end of an optical fiber having a front end for optical connection, the connector comprising:

a deformable sleeve having a front end and a bore for receiving said fiber;

a rigid tubular connector body having a front reference face defining a reference plane and a cavity in which the deformable sleeve is compressed to hold said fiber relative to the body; characterized in that:

the front end of the flexible sleeve, once compressed inside said cavity, is set back relative to said reference face of said connector body; the front face of said optical fiber projects beyond the front face of said flexible sleeve up to the limit of the reference plane; and the transverse and axial positioning of the optical fiber is provided by said flexible sleeve without there being any direct contact between the rigid tubular connector body and the optical fiber.

Thus, by screwing or snap-fastening a cap, or by any other conventional means in the art, the sleeve is displaced towards the front of the body and its dimensions are such as to prevent it from projecting beyond the front face of the connector. The optical fiber can be cut and polished before it is received in the connector, or its projecting portion can be cut and polished after insertion in the connector, preventing particles from the tapering sleeve becoming deposited thereon and spoiling its optical qualities.

To interconnect at least two optical fibers at their front ends, it is possible to use a common centralizer. The use of a centralizer does not imply that the fibers must project from said body insofar as the centralizer may be received in a portion left empty by the set-back sleeves. The centralizer is advantageously "floating" relative to the two rigid bodies, thereby avoiding any need for the purpose of centering the fibers to apply severe tolerances when machining the body of the connector. This also makes it possible to use a range of centralizers having different diameters in association with the same connector, the inside diameter of the centralizer being selected as a function of different sizes of optical fiber.

The outside portion of the connector body may include projecting elements for snap-fastening. It is thus possible to connect said connector body directly to a female component including complementary projections (or vice versa). Thus, two connector bodies can be connected face to face inside a connection cross-member that is tubular in shape.

It is also possible to connect a connector body to a hollow box which may constitute a connection terminal containing components for emission or reception. The box includes housings in which said projecting elements snap-fasten (or vice versa).

When used with a connection cross-member or with a connection terminal, the connector body may contain one or more fibers, centered as mentioned above.

Naturally, other fastening means such as screw fasteners, bayonet fasteners, and other known techniques may also be used.

Other characteristics and advantages of the invention appear from the following description of particular embodiments given by way of non-limiting example and described with reference to the drawings, in which.

Figure 1:
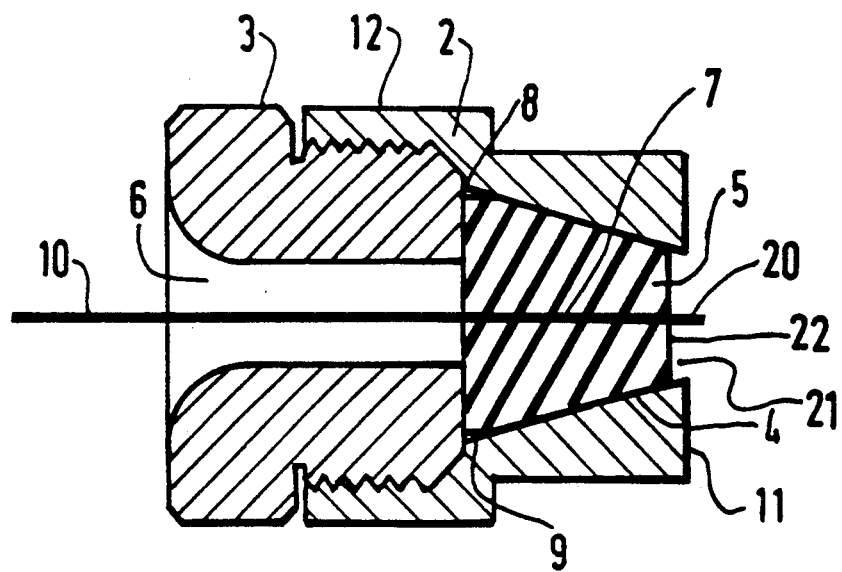
FIG. 1 is a section view through a connection element of the invention.

FIG. 1 shows a connection element having at least one optical fiber 10 passing therethrough. In the embodiment shown, the connection element is a rigid body 2 that is generally tubular in shape having a clamping cap 3 screwed therein or fixed therein by any other means. FIG. 1 shows a connection body after a fiber has been inserted and after the clamping cap 3 has been closed. The front end of the body has a tapering opening 4. A sleeve 5 is mounted inside the tapering opening 4, and the length of the sleeve is shorter than that of the opening. The sleeve 5 is made of a deformable material for example a resilient material such as neoprene. As in the example of FIG. 1, it may likewise have a tapering front portion, thereby facilitating insertion into the connection body 2.

After the fiber 10 has been passed through the orifice 6 formed in the cap 3, the sleeve is pushed into the tapering opening by tightening the clamping cap 3 (or by using any other technique known in the art). The front end 8 of the cap 3 comes into contact with the rear end 9 of the sleeve 5 and applies thrust thereto progressively as the cap 3 is tightened against said face. The fiber 10 is centered relative to the shape of the body 2 and it is held inside it without ever coming into contact therewith.

Figure 6:
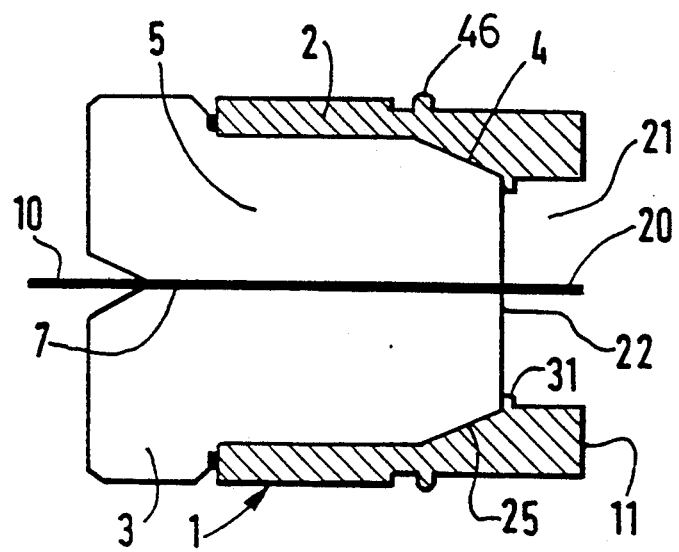
FIG. 6 is a section view through another connection body.

It is also possible to provide an abutment 31 inside the connector body 2 enabling a purely cylindrical sleeve of diameter greater than the inside diameter of the connector 2 to be engaged therein (see the example shown in FIG. 6).

This connector makes it possible effectively to bring together, hold, and center a bundle comprising a plurality of fibers. In accordance with a characteristic of the invention, the fiber(s) may be cut and optionally polished after being inserted in the connection element.

Once compressed, the sleeve 5 remains set back relative to the front end of the tubular body 2. This set-back can provide at least four functions. Firstly it prevents fiber guidance being deflected by a projecting portion of the sleeve, since such a portion tends to follow a curve on leaving the body. If the fiber is cut after being inserted in the connection element, it is possible to avoid any interfering material from the sleeve 5 being deposited on the optical fiber 10, which could have the effect of spoiling its optical properties. Space may be left to receive a lens for concentrating or for spreading out light. Finally, space is left in which a floating centralizer can be received.

Figure 2:
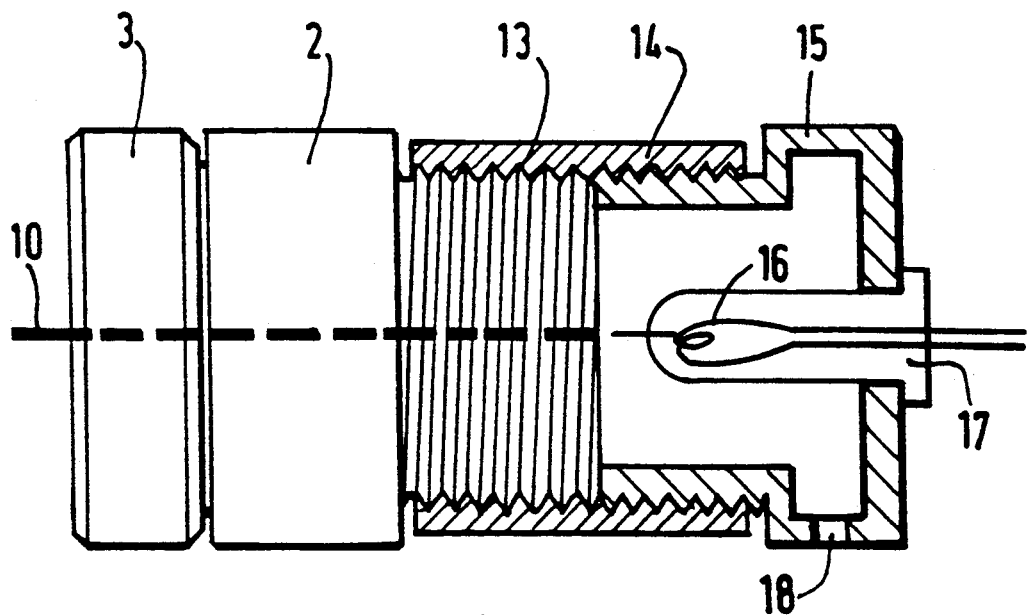
FIG. 2 shows one particular connector assembly using an element such as that shown in FIG. 1.

In the example shown in FIG. 2, the connection element 2 is connected to a connection terminal 15. The figure shows a version of the connection method in which the connection body has a screw thread 13 on the outside of its front end. The body is screwed into the connection terminal which includes a corresponding screw thread.

The terminal may include a plurality of different inlets for the purpose of receiving circular-lens diodes 16 via cylindrical openings 17 in the rear portion of the terminal, and also for receiving other optical components. Thus, a rectangular opening 18 formed through the bottom wall of the terminal enables a flat diode (not shown) to be inserted therein. Such a connection terminal 15 can also receive special lens for concentrating light as described below with reference to FIG. 4.

Figure 3:
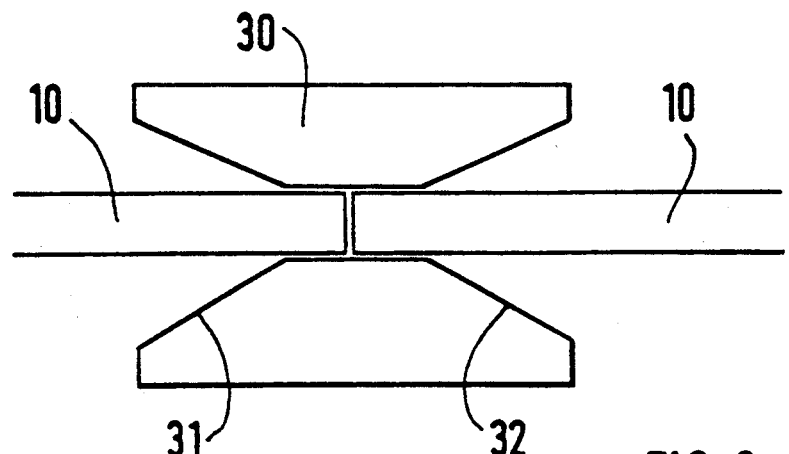
FIG. 3 is a section view through a simple centralizer.
Figure 5:
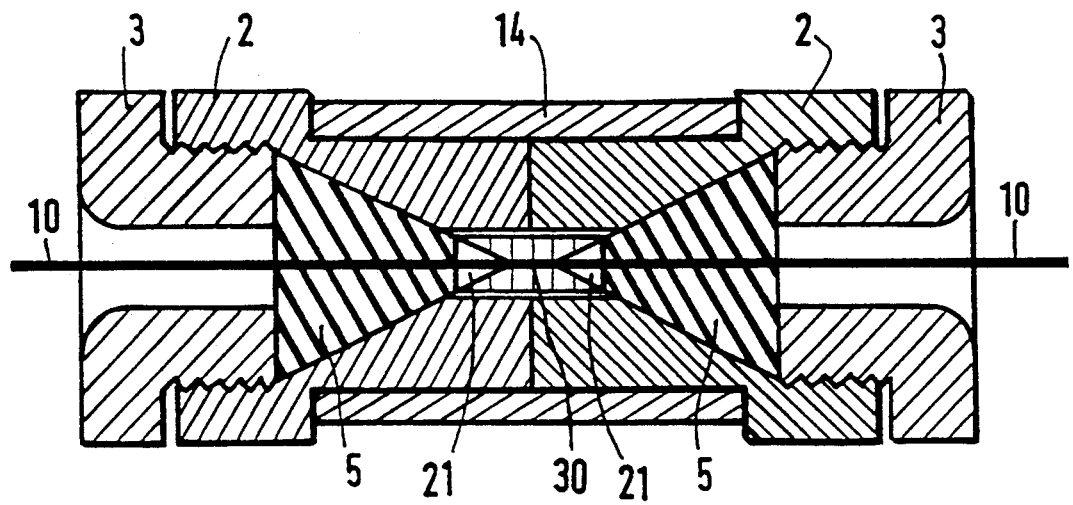
FIG. 5 shows a particular assembly of a connector using two elements such as that shown in FIG. 1.

To guarantee improved centering of fibers that are connected end-to-end, it is possible to use a rigid centralizer 30 such as that shown in FIGS. 3 and 5. The centralizer shown in particular in FIG. 3 is in the form of a washer 30 having two tapering inlets 31 and 32 that enable at least two fibers 10 to be positioned in a passage having dimensions that ensure that the two fibers are accurately face to face and on the same axis.

The way the two sleeves 5 (FIG. 5) are set-back relative to the front ends of the two tubular bodies 2 makes it possible to receive the centralizer. The dimensions of the centralizer are smaller than the openings in the front ends 11 of the rigid tubular bodies, thereby leaving the centralizer floating relative to the bodies while still ensuring that the fibers are properly positioned relative to each other. Different centralizers are used depending on the diameters of the fibers 10 that need centering.

For good light conduction, the inside wall of the bore of the centralizer may be made of reflecting material. When lenses are not used, Fresnel effects can be limited by applying an index-matching material between the optical fibers. In particular, index-matching adhesives may be used inside the centralizer. The adhesive may fix the floating centralizer 30 (FIG. 5) and optionally all of the components in the connection. Under such circumstances, the connector looses the advantage of being dismountable, however it is better adapted to withstand the risks of shock and vibration.

Figure 4:
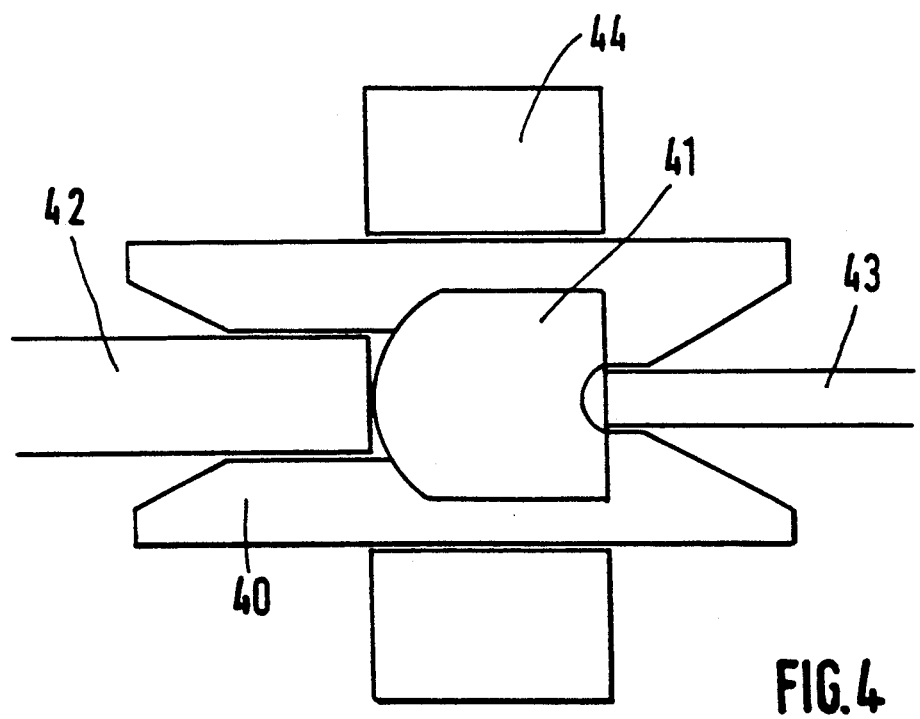
FIG. 4 is a section view through a light concentrating centralizer.

FIG. 4 shows an example of a more complex connection in which the floating centralizer is fitted with an optical device 41 enabling light coming from a fiber 42 to be concentrated in a fiber 43 of smaller diameter. In this example, the fibers 42 and 43 situated in the set-back of the connectors are received in the floating concentrating centralizer 40 in the same manner as before. However, they are no longer directly face-to-face since they are separated by the lens 41. To compensate for the thickness of the lens when two connector bodies 2 are received in a connection cross-member 14 as shown in FIG. 5, it is possible to provide a ring 44 having the same thickness as the lens 41.

The device can also be used for spreading out light from a fiber 43 over a bundle of several fibers 42.

FIG. 5 shows a connection cross-member 14 for end-to-end fixing of single fibers or bundles of several fibers using two connectors. The fixing can be achieved by screwing, snap-fastening, or any other technique known in the art.

In the example shown, a floating centralizer element 30 such as that shown in FIG. 3 can be used for positioning small-sized fibers.

FIG. 6 shows a simplified embodiment of the connector in which the deformable sleeve is clamped like a cork in a bottle. In the embodiment shown, the connection element comprises a body 2 that is generally tubular in shape, in which the sleeve 5 containing the fiber 10 is inserted. Since the diameter of the sleeve 5 is greater than the inside diameter of the connection element 2, such insertion has the effect of clamping the fiber along the entire length of the cylinder. The sleeve may have a smaller diameter at its front end 25 to facilitate insertion thereof into the connection element. The sleeve 5 is made of a deformable material, e.g. a resilient material such as neoprene.

In accordance with a characteristic of the invention, the sleeve 5 is set back at 21 from the front end of the body 1. This set-back may be ensured by having a larger circumference at the rear end 3 of the sleeve 5. A centralizer element such as shown in FIGS. 3 and 4 may also be received in this connector.

Projecting elements 46 enable this embodiment and the following embodiments of the connector to be snap-fastened in a female component. Other methods known in the art may also be used for holding such components together.

Other embodiments of the connector are possible, for example systems having multiple channels may be implemented. Numerous variants may naturally be devised, particularly by substituting technically equivalent means, without thereby going beyond the ambit of the invention.

I claim:

1. An optical fiber connector for receiving at least one end of an optical fiber having a front end for optical connection, the connector comprising:
    a rigid tubular connector body having a front reference face defining a reference plane, a rear end and a cavity; and, a deformable non-metallic sleeve having a front end and a longitudinal bore for receiving said fiber, said sleeve being inserted in said cavity wherein the transverse and axial positioning of the optical fiber are provided by said flexible sleeve without any direct contact between the rigid tubular connector body and the optical fiber and wherein the front face of said flexible sleeve once mounted inside said cavity is set back relative to said reference plane, the front face of said optical fiber projecting beyond the front face of said flexible sleeve up to the limit of the reference plane.

2. An optical fiber connector according to claim 1, characterized in that a floating centralizer is housed in the set-back left by the deformable sleeve.

3. An optical fiber connector according to claim 1, characterized in that an optical lens is housed in the set-back left by the flexible sleeve.

4. An optical fiber connector according to claim 1, characterized in that the cavity is tapering in shape.

5. An optical fiber connector according to claim 1, characterized in that the flexible sleeve is tapering in shape.

6. An optical fiber connector according to claim 1, characterized in that said deformable sleeve is compressed within said cavity wherein the compression is provided by a clamping cap inside the cavity.

7. An optical fiber connector according to claim 1, characterized in that the connector body has a rim at its rear end for facilitating insertion of the flexible sleeve.

8. An optical fiber connector according to claim 1, characterized in that the cavity has an inside diameter smaller than an outside diameter of the flexible sleeve, wherein the flexible sleeve is compressed by the cavity.

9. An optical fiber connector according to claim 1, further comprising projecting elements projecting from said connector body, said projecting elements allowing snap-fitting in a terminal component.

* * * * *